United States Patent [19]

Boyer et al.

[11] 3,828,416

[45] Aug. 13, 1974

[54] METHOD OF REINFORCING CONCRETE

[75] Inventors: Wilhelm Boyer; Josef Ritter; Gerhard Ritter, all of Graz, Austria

[73] Assignee: AVI Alpenlandische Veredelungs-Industrie Gesellschaft m.b.H., Osterreich, Austria

[22] Filed: June 11, 1973

[21] Appl. No.: 368,469

[52] U.S. Cl................. 29/417, 29/DIG. 3, 52/664, 140/107
[51] Int. Cl............................................ B23p 17/00
[58] Field of Search ........ 29/411, 412, 417, DIG. 3, 29/DIG. 40; 140/107; 52/664

[56] References Cited
UNITED STATES PATENTS

| | | | |
|---|---|---|---|
| 2,368,047 | 1/1945 | Southwick | 140/107 |
| 3,300,938 | 1/1967 | Van Schyndel et al. | 52/664 X |
| 3,397,565 | 8/1968 | Ritter et al. | 140/107 X |
| 3,475,876 | 11/1969 | Oroschakoff | 52/664 X |
| 3,688,810 | 9/1972 | Spencer | 140/107 |

Primary Examiner—Charles W. Lanham
Assistant Examiner—V. A. Dipalma
Attorney, Agent, or Firm—Ernest F. Marmorek

[57] ABSTRACT

The disclosure is concerned with the reinforcement of concrete by grids. Grids are produced in lengths of at least 50 metres and having longitudinal steel rods interconnected by transverse elements. Said grids are rolled up in their longitudinal direction and stressed past the yield point of said rods to produce a permanent deformation. To use said grid, pieces are cut off and straightened, and then laid longitudinally parallel side by side, the spacing between adjacent rods of adjacent pieces being equal to the spacing between adjacent rods within said pieces.

9 Claims, No Drawings

METHOD OF REINFORCING CONCRETE

At the present time load bearing slabs of steel reinforced concrete are almost exclusively reinforced with grids of steel rods which are connected together at their points of intersection by welding, but occasionally by other suitable methods. The grids employed for reinforcement are in general produced in a fixed range of sizes and the rods in each direction are of different diameters. The specific cross-sections of the steel rods in the two directions are generally so matched that the grids in one direction, the spreader direction, are of a smaller cross-section than those in the direction of loading.

For example, a range of grids in production has the specific cross-sections of steel of two successive sizes of grid differing by 0.2 cm. $^2$/m, and the specific cross-section of steel in the spreader direction is one fifth of the specific cross-section of steel in the direction of loading.

If, for example, it is laid down in the building specification that, in the case of slabs uniaxially loaded, the specific cross-section of steel in the spreader direction is to amount to a fifth of the cross-section of steel available in the direction of loading, such slabs can be reinforced with the above-mentioned grids. A grid is selected having the necessary cross-section in the direction of loading, and the grids are laid maintaining a predetermined overlap at the edges of adjacent grids. This overlapping ensures continuity in the spreader direction. The structure then has in both directions the necessary specific cross-sections of steel.

In the case of reinforcement of slabs with two-way loading, that is, slabs of which the ratio of the length L to the width B amounts to $$2:1 \geq L:B \geq 1:1$$

two grids are laid in opposite directions on top of one another, the direction of loading of the one grid corresponding with the spreader direction of the other grid, and the specific cross-section in the direction of loading of the one grid is added to the specific cross-section of steel in the spreader direction of the other grid.

New discoveries in the field of steel concrete construction especially in respect of deformations occurring in the case of load-bearing slabs have now brought about a departure from this way of establishing a minimum reinforcement in the spreader direction. The minimum reinforcement is no longer related only to the specific cross-section of steel in the direction of loading but is also made to depend upon the thickness of the slab to be reinforced.

The already very wide range of possible dimensions of slabs to be reinforced has made it difficult, with the relatively few sizes of mats available, to achieve satisfactory reinforcement of all the sizes of slab used in construction, without leading to unwarrantable waste of material. With the combinations of spreader to lengthwise reinforcement ratios now becoming more and more necessary such a range of possibilities arises that production of the grids in the manner used hitherto has become practically impossible.

Hitherto, in fact, as has already been pointed out, the grids used to be produced in a fixed range of sizes and kept in stock in storage areas. Under the new situation now arising it would only be possible to manufacture grids to size for each individual structure, and this, because of the seasonal fluctuations in demand, would lead to difficulties in production.

Grids have also already been known which have load-bearing rods in one direction only, the rods in the other direction only having the object of keeping the load-bearing rods at a predetermined distance from one another. Such grids have been made so that they can be rolled up in the direction of the spacers, or have been made only in quite narrow strips, say 20 to 70 cm. wide. In both cases the load-bearing rods are at most as long as the ordinary, well known reinforcement rods, and this, because of the necessary cutting to length of the grids for the purpose of matching the measurements of the structure leads to great waste of costly reinforcement.

In order to meet these difficulties, and in accordance with the present invention in a method of reinforcing concrete a reinforcing grid, at least 50 metres in length, which has steel rods of high tensile strength in the longitudinal direction interconnected by transverse elements, is rolled up in the direction of the high tensile steel rods such that a permanent deformation is produced, the steel rods having been stressed beyond their yield point, and pieces of a required length are then cut from the grid, straightened out and laid in position side by side with their longitudinal axes parallel, adjacent rods from adjacent pieces of the grid having the same spacing as between adjacent rods within each piece of the grid.

The invention also includes reinforcement for concrete produced in accordance with the method, in which the rods and transverse elements have different strength characteristics, the rods having the higher strength and also being shaped to provide improved keying of the steel rods in the concrete.

The reeling up of grid sheets of great length into rolls is, in itself, already known in order to allow the pieces needed for the reinforcement to be cut off from these grid sheets. Moreover, grid sheets which exhibit different strength characteristics in two directions at right angles are also known. Hitherto, however, as already mentioned, grid sheets have always been rolled up in the direction of the wire of lower strength in order to preserve under all circumstances the straightness of the high-tensile rod reinforcement.

Since the width of the grid is determined by the width of the machine on which it is produced, only relatively short load-bearing rods could be provided with the grid sheets known hitherto. This has led to difficulties on reinforcing load-bearing slabs having markedly different dimensions.

In the case of known strip-shaped reinforcement members which exhibit equal strength characteristics in the longitudinal and transverse directions produced in great lengths and delivered in rolls, there must be a very large number of unavoidable overlapping joints at the edges of adjoining strips. This is because, on the one hand, the necessity of straightening the strips before use makes it compulsory to keep the width of the strips relatively small to enable straightening and, on the other hand, in order to make use of the rods running in the direction across the strip as co-load-bearing reinforcement transfer of force in the direction across the strip must be guaranteed.

In the case of the method of providing reinforcement in accordance with the invention, in which grid sheets are employed which are rolled up in the direction of the high-tensile load-bearing rods, the length of the load-bearing rods can be chosen to be very large, for example 100 metres, and the width of the grid sheet can be so determined that the machine making it can be laid out to save space and consideration can be given to the dimensions of the loading surface of the vehicle which is to transport the grids.

The grids once rolled into rolls, can be stored on site in a way which saves space. The pieces necessary for the reinforcement are straightened and cut off as required right on the site in straightener and cutter devices on hand. Storage space which, especially in large cities is at a premium, is thereby reduced to a minimum.

Straightening of the grid sheets can be particularly easily accomplished if the spreader-rods terminate flush with the outermost load-bearing rods. The ends of the spreader rods projecting beyond the outermost load-bearing rods are easily distorted and can then catch in the straightening and cutting devices.

This way of laying the grid sheets whereby the same specific cross-section of steel is provided right across the reinforced area, on the one hand reduces the work of laying to a minimum and on the other hand decreases the chance of errors occuring in reinforcement. It is sufficient to mark the position of the first side-rod of each piece of grid sheet by a chalk line on the shuttering, as the overlap at the edges of adjoining pieces of grid sheet necessary in the case of existing grids is eliminated.

By laying the grid sheets in two directions at right angles to one another any desired proportion between the load-bearing and spreader reinforcement in the case of uniaxially stressed slabs or of the longitudinal and transverse reinforcement in the case of two-way stressed slabs can be produced in the simplest way. In this way the recent innovations in steel reinforced concrete construction can be satisfied and without wastage due to overlapping, since the grid sheets are laid in two directions at right angles to one another in the case of two-way reinforced slabs the summation of the cross-sections of steel in the load-bearing and spreader directions is also eliminated.

Since the grid sheets employed in accordance with the invention are to be laid without overlap of adjoining edges of the sheet the spread-rods merely have the duty of ensuring the relative positions of the load-bearing rods. They can therefore be produced of any sort of material, even of a quality whereby the losses caused by the lost spreader-rods are kept within such low limits that by the rationalization which results from the method they are more than compensated for.

Since, in fact, as already mentioned the load-bearing rods have lengths of 50 metres and over, load-bearing slabs of any size can be reinforced without wastage of high grade steel reinforcement. From the rolls, sheets of any length can be cut off and even in the most unfavorable case only an unusable remnant of each roll is left over, and this represents only a fraction of one percent of the whole of the reinforcement contained in the roll. With grids which are produced in rigidly predetermined lengths the cutting waste amounts in our experience to 8 to 10 percent of the total reinforcement.

For the load-bearing rods steels of high yield point are employed. The raising of the yield point can be achieved either by alloying (so-called self-hardening steels) or by cold-working (so-called cold-worked steels).

In order to be able to make full use of the high yield point of the load-bearing rods and yet not obtain in the concrete undesirably large cracks, the load-bearing rods can have their cross-section and/or surface contouring to give a better grip in such a way that because of their surface contouring and/or shape of cross-section they are in a position to secure the bond between concrete and steel without the anchoring effect of the welded joints at the points of intersection of the rods of present structural steel grids.

Thus, there results a definite simplification and cheapening of the production process, since the welded joints only have to accept those forces which result from the handling of the piece of grid sheet and hence cannot influence the safety of the structure. They can be welded with a smaller current consumption and, moreover, the careful testing of the welded joints necessary in the case of known grids can be omitted.

We claim:

1. In a method of reinforcing concrete wherein a reinforcing grid is provided having steel rods of high tensile strength in a longitudinal direction interconnected by transverse elements, said grid being rolled up to enable easy transport, the improvement comprising fabricating said grid and said longitudinal steel rods with a length of at least 50 metres; rolling up said grid in said longitudinal direction thus stressing said steel rods beyond their yield point to produce a permanent deformation thereof; cutting pieces of required length from said rolled-up grid; straightening out said pieces; laying said pieces in position side by side longitudinally parallel; and spacing said pieces such that adjacent steel rods from adjacent grid pieces have the same spacing as adjacent rods within said pieces.

2. The method of claim 1, wherein said rods and said transverse elements have different strength characteristics, said rods having the higher strength and also being shaped to provide improved keying of the steel rods in said concrete.

3. The method according to claim 1, wherein said steel rods lying in said longitudinal direction are comprised of cold-worked steel.

4. The method according to claim 1, wherein said rods lying in said longitudinal direction are comprised of self-hardening steel.

5. The method according to claim 1, wherein said rods of said longitudinal direction are formed as double or twin rods.

6. The method according to claim 1, wherein said longitudinal rods are profiled to provide improved keying with said concrete.

7. The method according to claim 1, wherein said transverse elements terminate flush with the two outermost of said longitudinal rods of said grid.

8. The method according to claim 1, wherein said transverse elements are also of steel and are welded to said longitudinal rods.

9. The method according to claim 1, wherein said transverse elements are comprised of synthetic plastics material.

* * * * *